J. KAROLLE.
BUTTER PRESSING AND MOLDING MACHINE.
APPLICATION FILED MAR. 13, 1916.

1,217,460.

Patented Feb. 27, 1917.
2 SHEETS—SHEET 1.

Inventor
J. Karolle

By A. M. Wilson
Attorney

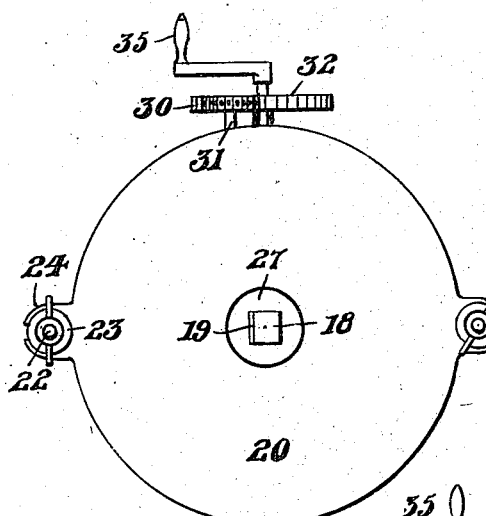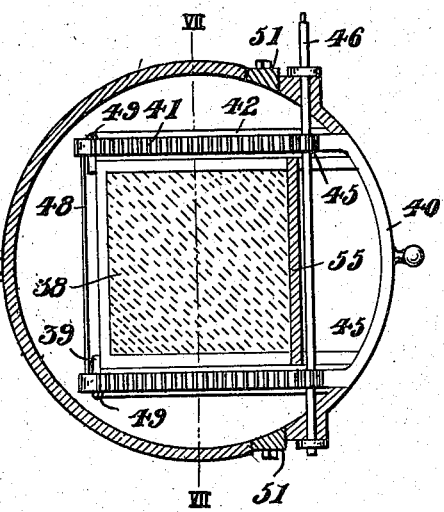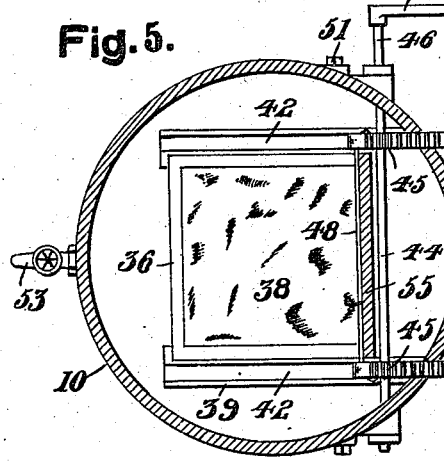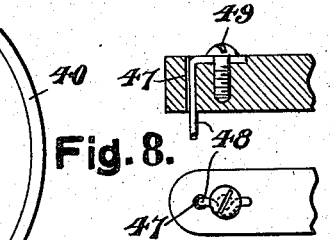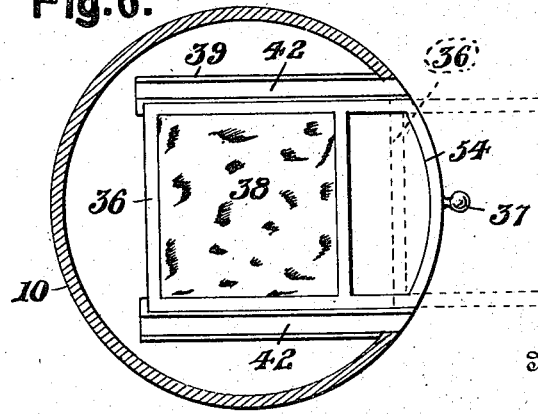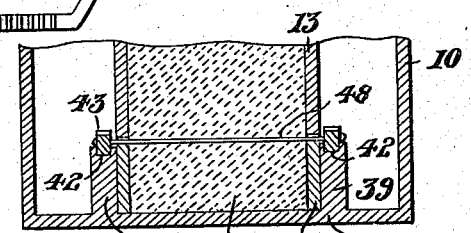

UNITED STATES PATENT OFFICE.

JOHN KAROLLE, OF FLINT, MICHIGAN.

BUTTER PRESSING AND MOLDING MACHINE.

1,217,460.  
Specification of Letters Patent.  
Patented Feb. 27, 1917.

Application filed March 13, 1916. Serial No. 83,840.

*To all whom it may concern:*

Be it known that I, JOHN KAROLLE, a subject of the King of Hungary, residing at Flint, in the county of Genesee and State of Michigan, have invented certain new and useful Improvements in Butter Pressing and Molding Machines, of which the following is a specification.

This invention relates to new and useful improvements in butter pressing and molding machines.

The primary object of the invention is the provision of a suitably refrigerated press adapted for extracting the moisture from butter and packing a predetermined quantity thereof in a mold for ready removal from the press for purposes of use and sale.

A further object of the invention is the provision of a press for packing butter arranged with a cutting device for separating the body of butter with a desirable portion thereof filling a removable mold member.

A still further object is to provide a butter packing device that is easy and inexpensive to manufacture but which possesses extreme strength having the parts thereof easily removed for cleaning and arranged with a refrigerant chamber for maintaining the butter in a cool condition while being operated upon.

With the general objects in view and others that will appear as the nature of the invention is better understood, the same consists in the novel combination and arrangement of parts hereinafter fully described, illustrated in the accompanying drawings and then claimed.

In the drawings forming a part of this application and in which like designating characters refer to corresponding parts throughout the several views:—

Fig. 3 is a top plan view of the device.

Fig. 4 is a transverse sectional view taken upon line IV—IV of Fig. 1 before the molded butter has been severed.

Fig. 5 is a similar view after the butter cutting member has performed its operation.

Fig. 6 is a transverse sectional view taken upon line VI—VI of Fig. 1, the molding being shown in dotted lines partially removed from the machine.

Fig. 7 is a vertical transverse sectional view taken upon line VII—VII of Fig. 4, and Fig. 8 illustrates by plan and sectional detail views the manner of mounting the ends of the butter cutting wire.

Figure 1:
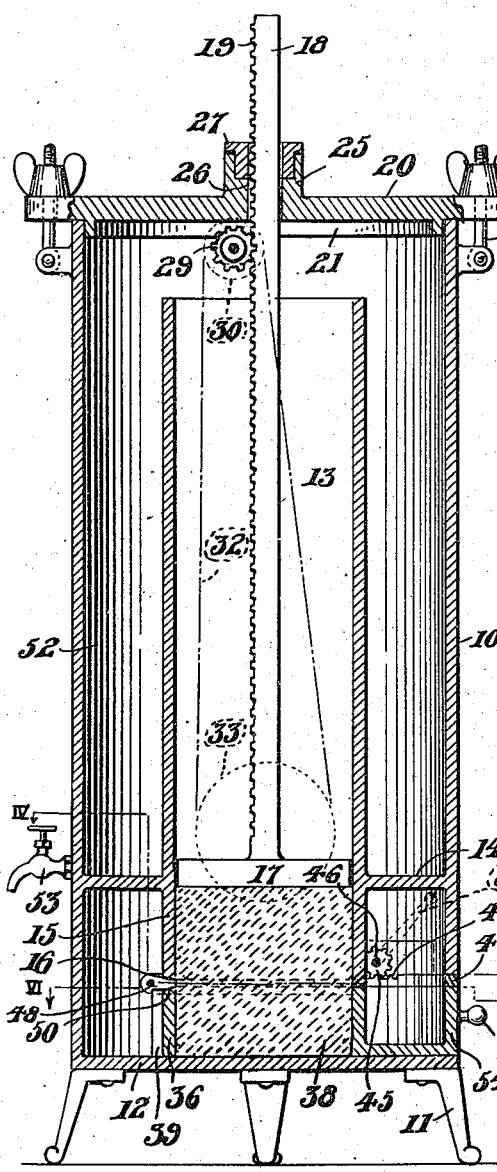
Figure 1 is a central vertical sectional view of the device.
Figure 2:
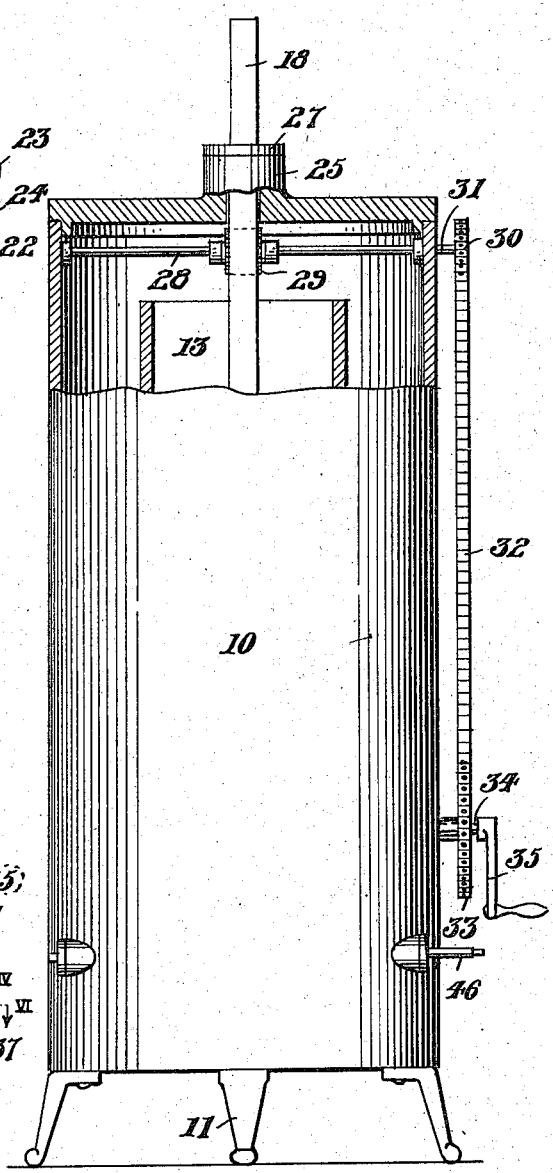
Fig. 2 is a side elevation thereof partially shown in vertical central section upon a plane at right angles to the line of section shown in Fig. 1.

The present machine is arranged for pressing, packing and molding quantities of butter and provides an outer cylindrical casing 10 mounted upon suitable legs 11 beneath the bottom 12 of the casing while a butter receiving tube 13, rectangular in cross section, is centrally arranged upright within the casing 10.

An annular diaphragm or false bottom 14 is arranged within the said casing spaced above and in parallelism with the bottom 12 and having the tube 13 extending therethrough, the portion 15 of the said tube below the diaphragm 14 terminating substantially midway between the said diaphragm and bottom and constituting a rectangular mouth or outlet 16 through which butter may be downwardly forced.

A rectangular block form of plunger or piston 17 is arranged within the tube 13 being vertically movable therein by means of an auxiliary positioned stem 18 having teeth 19 upon one edge thereof and thus constituting a tooth operating rack for the said plunger. A removable lid or cover 20 circular in form is provided for the casing 10 having a depending annular flange 21 adapted for fitting within the open upper end of the casing, pivoted locking bolts 22 having set nuts 23 thereon being arranged for engaging slotted oppositely arranged lugs 24 of the lid 20 in the usual manner. The lid 20 is provided with a centrally projecting boss 25 having a rectangular opening 26 therethrough with a bearing washer 27, the stem 18 being freely slidable through the said washer and opening.

An operating shaft 28 is transversely journaled through the casing 10 and has a pinion 29 centrally secured thereto in mesh with the stem teeth 19 when the plunger is positioned within the tube 13 and the lid 20 is in position upon the casing. The gear 30 is provided upon an outwardly extending end 31 of the shaft 28 while a sprocket chain 32 connects the gear 30 with a relatively large gear 33 mounted upon a stub shaft 34 projecting from the casing 10 at a point beneath the shaft extension 31. A removable operating crank 35 is provided for the stub shaft 34, it being evident that by turning the crank 35 for operating the shaft 28 in one direction, the stem 18 and plunger 17 will be forcibly depressed while the stem and plunger will be elevated upon a reversal in the turning direction of the said crank.

A mold 36 in the form of a drawer or slide is arranged within the casing 10 beneath and in alinement with the lower end portion 15 of the tube 13, the said slide having a pull knob or handle 37 whereby the mold 36 may be withdrawn and inserted when desired.

The mold 36 is in the form of a rectangular frame open at both sides and slidable upon the casing bottom 12 and when in its operative position as illustrated in Fig. 1 of the drawings is arranged for receiving the butter 38 which is forcibly packed therein by means of the descending plunger 17.

Opposite parallel guide plates 39 are arranged at opposite sides of the mold 36 and between which guides the mold is adapted to slide while an arch-shaped cutter frame 40 has its opposite legs 41 slidable in longitudinal grooves 42 in the upper edges of the said guides 39.

Teeth 43 are arranged upon the upper edges of the legs 41 and a transversely arranged shaft 44 extends through the casing 10 and is provided with pinions 45 in constant mesh with the said teeth. An outwardly projecting end 46 of the shaft 44 is adapted to receive the aforementioned crank 35 whenever desired for the purpose of turning the shaft 44 and thus slidably moving the cutter frame 40 inwardly and outwardly of the casing 10, it being noted that the outer end of such cutter frame is of the same curvature as the adjacent side of the casing.

The inner ends of the legs 41 are provided with transverse alining perforations 47 through which a butter cutting wire 48 is extended and secured to the said legs 41 by means of screws 49. When the cutter frame is normally positioned inwardly, as best illustrated in Fig. 1 of the drawings, the same is slightly to the rear of the butter column 38 and in horizontal alinement with a slight space between the upper edge 50 of the mold 36 and the lower end mouth 16 of the butter feeding tube portion 15. By turning the crank 35 when positioned upon the lower shaft 46, the cutter frame 40 is forced outwardly, thus drawing the cutting wire 48 through the butter 38 between the mold and the tube portion 15, the said wire 48 assuming the position illustrated in Fig. 5 of the drawings at the completion of the butter cutting operation and at which time the crank 35 may be turned in the reversed direction thus returning the wire 48 and cutter frame 40 to their normal positions as shown in Fig. 4.

The casing 10 is preferably provided with removable plugs 51 at any desirable point for allowing access to the interior of the casing adjacent the guides 39 for the purpose of effecting repairs in the cutter wire 48. The lower extension 15 of the tube 13 is provided upon its forward side with a bottom edge 55 extending lower than the other sides of the said tube and acting as an abutment for the cutting wire 48 as shown in Fig. 5.

The complete operation of the invention will be apparent from the within detailed description thereof, it being noted that the annular chamber 52 between the tube 13 and the casing 10 is employed for the reception of ice to cool the butter within the tube 13, a faucet 53 being arranged adjacent the bottom of the chamber 52 for drawing off the water therefrom outwardly through the side of the casing 10. With the mold 36 positioned within the casing, a desirable quantity of butter is placed in the tube 13 and the plunger 17 inserted in the tube and the lid 20 secured upon the casing and this bringing the pinion 29 in mesh with the stem gear 19 provides for exerting a downward pressure upon the butter 38 by turning the crank 39 when attached to the stub shaft 34. The moisture is thus extracted from the butter and the butter is packed into the mold 36 completely filling the same and whereupon the crank 35 is positioned upon the shaft 46 and the cutting wire 48 drawn through the butter even with the upper edge of the mold 36, which mold is then removed by means of the pull knob 37 for extracting the butter block so molded. The cutter frame 40 may then be returned to its normal position and after replacing the mold 36 more butter may be packed into the same by repeating the operation. It will be seen that the forward plate 54 of the forward connecting portion of the mold 36 to which the knob 37 is attached having a curvature corresponding to that of the casing 10 which together with the forward bar of the cutting frame 40 are in alinement with the side wall of the casing when the cutter frame and mold slide are in their normal closed positions.

A ready means for molding butter is thus provided which is readily operable either in household or dairy use.

While the form of the invention herein shown and described is what is believed to be the preferable embodiment thereof, it is nevertheless to be understood that minor changes may be made in the form, proportion and details of construction without departing from the spirit and scope of the invention as hereinafter claimed.

What I claim as new is:—

A butter packing machine comprising a casing, a removable lid therefor, a butter-receiving tube axially mounted in the said casing and providing a refrigerating chamber between the said tube and casing, a packing plunger operatively arranged within said tube and a removable butter-receiving mold arranged within the casing beneath said tube, parallel upstanding guides at opposite sides of the mold in frictional contact therewith, a U-shaped cutter frame having the legs thereof slidably mounted upon said guides, a cutting wire carried by the frame and having a path of movement transversely of the plane of said tube and mold and intermediate thereof, rack teeth on the upper sides of said frame legs, a transverse shaft journaled through the casing, operating pinions upon the said shaft in mesh with said racks, and an operating crank upon the shaft exteriorly of said casing.

In testimony whereof I affix my signature.

JOHN KAROLLE.

Copies of this patent may be obtained for five cents each, by addressing the "Commissioner of Patents, Washington, D. C."